United States Patent
Gunther

[11] Patent Number: 6,022,210
[45] Date of Patent: Feb. 8, 2000

[54] HOT RUNNER NOZZLE

[75] Inventor: Herbert Gunther, Allendorf, Germany

[73] Assignee: Gunther Heisskanaltechnik GmbH, Germany

[21] Appl. No.: 08/978,618

[22] Filed: Nov. 26, 1997

Related U.S. Application Data

[63] Continuation-in-part of application No. 08/590,408, Jan. 25, 1996, Pat. No. 5,759,595.

[30] Foreign Application Priority Data

Jan. 31, 1995 [DE] Germany ............ 295 01 450 U

[51] Int. Cl.[7] ................................................ B29C 45/20
[52] U.S. Cl. ................................. 425/549; 264/328.15
[58] Field of Search ................................ 425/549, 570, 425/552; 264/328.15

[56] References Cited

U.S. PATENT DOCUMENTS

| | | | |
|---|---|---|---|
| 3,091,812 | 6/1963 | Witkowski . | |
| 4,586,887 | 5/1986 | Gellert . | |
| 4,622,001 | 11/1986 | Bright et al. | 425/549 |
| 4,663,811 | 5/1987 | Gellert . | |
| 5,346,388 | 9/1994 | Gellert | 425/549 |
| 5,569,475 | 10/1996 | Adas et al. . | |
| 5,665,397 | 9/1997 | Fisher et al. | 425/552 |

FOREIGN PATENT DOCUMENTS

| | | |
|---|---|---|
| 2 716 950 | 1/1978 | Germany . |
| 7 900 927 | 8/1980 | Netherlands . |

OTHER PUBLICATIONS

CRC Handbook of Chemistry and Physics, pp. E–11 through E–14, 1982–83.

*Primary Examiner*—Tim Heitbrink
*Attorney, Agent, or Firm*—Lowe Hauptman Gopstein Gilman & Berner

[57] ABSTRACT

A hot runner nozzle structure provides insulation to reduce heat transfer to a utilizing tool and to increase accuracy of temperature measurement and control. A shaft foot of extremely low heat conductivity is used to separate a point of contact between a feed tube shaft and the tool. The shaft foot may be formed of titanium for example. An insulating cap of extremely low heat conductivity is surrounds the shaft foot in the vicinity of the nozzle tip. The cap may be formed of PEEK or of titanium for example. Gaps may be provided between the insulating cap and shaft foot and between the shaft foot and feed tube shaft. In an alternate embodiment having smaller dimensions, an insulating ring is provided at the end of the feed tube shaft. The structure, combined with a positioning sleeve surrounding the feed tube shaft, permits placing a heat sensor much closer to the nozzle tip in order to obtain more accurate temperature measurements.

24 Claims, 2 Drawing Sheets

HOT RUNNER NOZZLE

This is a continuation-in-part of application Ser. No. 08/590,408, filed Jan. 25, 1996, now U.S. Pat. No. 5,759,595 and entitled "Hot Runner Nozzle", the contents of which are hereby expressly incorporated by reference.

FIELD OF THE INVENTION

This invention relates broadly to injection molding devices, and more particularly to an improvement in a nozzle used in such devices.

As known in the art, a mold (such as a cavity mold) is typically used when an article is formed by injection molding. In such an injection process, runners are provided to carry plastic or other material from one cavity (for one part of the article) to another cavity (for another part, or article). The injection material tends to solidify in these runners and must be removed, thus leading both to excessive waste of material and to increased costs for removal of the waste material. It is thus known to heat the material in the runner and in the injection nozzle. Associated with such heating is a need for accuracy in determination of the temperature in order to provide better control of the injection process.

However, accurate measurement of the temperature at the feed tube end could not be accurately obtained in prior art temperature measurement devices for a hot runner nozzle. Indeed, even in the parent application previously filed by the present applicant, such measurement provided an improvement in measurement accuracy but did not detect the temperature at the feed tube end.

It is accordingly an object of the present invention to provide accurate measurement of the temperature of the plastic mass flowing through the injection nozzle.

It is another object of the invention to provide accurate measurement of the heating unit temperature at the end of a feed tube of a hot runner nozzle and to enable control of the heating temperature with greater precision.

It is a further object of the invention to reduce heat dissipation from the bottom end of a hot runner nozzle, and from the tip thereof, to the tool.

It is a more specific object of the invention to provide a cap formed of a metal having extremely low heat conductivity at a bottom end of the nozzle. In order further to reduce heat dissipation, it is also an object of the invention to provide an insulating cap surrounding a shaft foot made of extremely low heat conductivity material, wherein the latter may be threadedly engaged with the nozzle housing.

It is yet another object of the invention to reduce heat dissipation still further by providing at least one insulating gap between one or more of the components at the end of the feed tube, such as the feed tube shaft, the shaft foot, and the insulating cap of the nozzle.

It is still a further object of the invention to provide a heating unit for a feed tube shaft in a hot runner nozzle which extends to a region in the vicinity of the tip, in which the tube shaft has no surface contact with the tool, to provide a heat sensor having a measuring point between the end of the heating coil and the tip, in which the measuring point and at least a portion of the heating coil are surrounded by a material having extremely low heat conductivity, such as titanium, while further providing an insulating cap on the titanium or similar material.

It is still another object of the invention to provide such advantages to nozzles which may be used both in larger and smaller environments, and specifically to nozzles structured for mounting in tools having reduced volume.

For such structures of reduced volume it is thus an object of the of the invention to provide a hot runner nozzle in which a receiving ring structure surrounds a portion of the hot runner nozzle tip, the ring being formed of material having extremely low heat conductivity, such as titanium, thus to reduce the volume of the hot runner nozzle in the vicinity of the heating coil and heat sensor measuring point.

It is yet another object of the invention to provide a hot runner nozzle structure including a heater and temperature sensor which simplifies manufacture of the same.

Still another object of the invention is to provide a perforated tube for supporting and stabilizing a heating coil during a casting process for a brass seal, to permit the cast brass to flow therethrough and thus to envelope the heating coil properly.

It is thus still another object of the invention to provide a novel method for manufacturing hot runner nozzles to accurate small sizes for use in injection mold tools and manifolds of varying designs and having varying sizes.

These and other objects, features and advantages of the present invention will become readily apparent to those skilled in the art from the following description and drawings, wherein there is shown and described a preferred embodiment of the invention, simply by way of illustration and not of limitation of one of the best modes (and alternative embodiments) suited to carry out the invention. The invention itself is set forth in the claims appended hereto. As will be realized upon examination of the specification and drawings and from practice of the same, the present invention is capable of still other, different, embodiments and its several details are capable of modifications in various obvious aspects, all without departing from the scope of the invention as recited in the claims. Accordingly, the drawings and the descriptions provided herein are to be regarded as illustrative in nature and not as restrictive of the invention.

BRIEF DESCRIPTION OF THE DRAWINGS

The accompanying drawings, incorporated into and forming a part of the specification, illustrate several aspects of a preferred embodiment of the present invention and, together with the description, serve to explain the principles of the invention. In the drawings.

DETAILED DESCRIPTION

Figure 1:
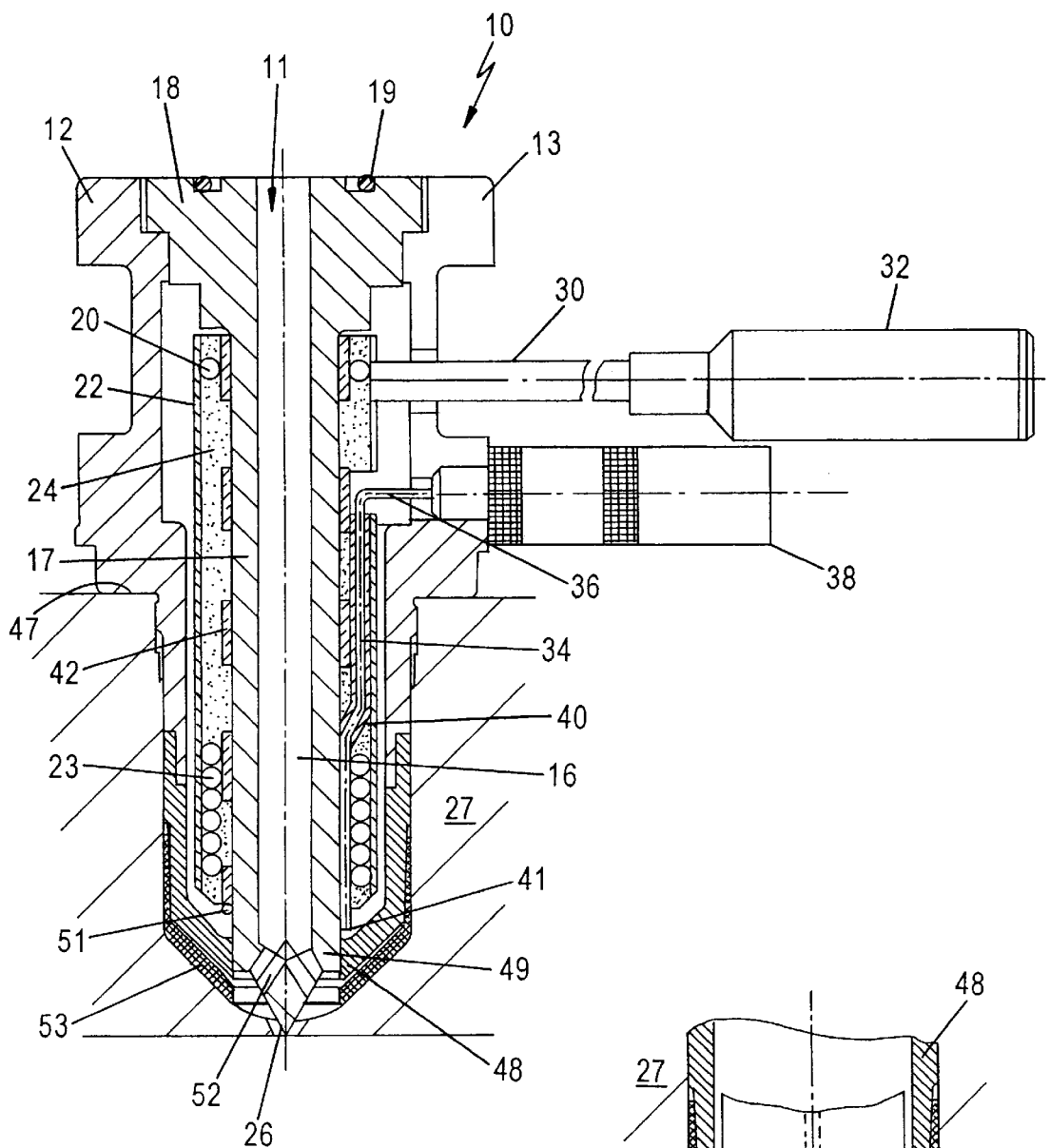
FIG. 1 shows a preferred embodiment of a hot runner nozzle assembly in accordance with the invention.

Referring now to the drawings, there is shown in FIG. 1 a nozzle 10 in accordance with the invention, the nozzle having a tip 26 and being used in a tool 27. Tool 27 does not form part of the present invention.

Nozzle 10 includes a housing 12 within which is provided a structure having an inlet 11 and a feed tube hollow 16. Feed tube hollow 16 is formed in a structure including a feed tube head 18 and a feed tube shaft 17, extending from an upper surface of housing 12 to tip 26. Housing 12 includes a recess 13, as described in the parent application hereof, and a sealing ring 19. A heating unit 20 for the nozzle includes an outer steel sheath 22, a heating coil 23, a stabilizing tube in the form of a perforated copper sheet 42, for example, and a compound body 24 made of brass which is cast to form the structure.

The heating coil 23 may be a helical double-wound (bifilar) coil, a sheet metal resistor of generally cylindrical shape for example, or any other suitable heating device. Tube 42 advantageously provides an advantage in forming the apparatus, by supporting and stabilizing heating coil 23 during a casting process for the compound body 24. Tube 42, which is preferably a perforated tube, prevents inward movement of heating coil 23 toward the outer surface of the feed tube shaft during casting. Thus, the inner diameter of heating unit 20, at the outer diameter of feed tube shaft 17, is not damaged by movement of the heating coil. Moreover, by preventing inward movement of any portion of coil 23 beyond an acceptable limit, tube 42 assures that the coil is not damaged during boring of the feed tube hollow 16. The tube 42 is perforated in order to provide a cross-sectional area for the compound body which is greater than only the spacing between steel sheath and tube 42. Thus, during the casting process the cast brass flows through the perforations in tube 42 in order fully to envelope the heating coil 23.

Also illustrated in FIG. 1 are connectors 32 and 38 for heating coil 23 and for a heat sensor 34, respectively. A number of leads provide a connection means 30 between connector 32 and heating coil 23. Connection wiring 36 is provided between connector 38 and heat sensor 34. The specific shape, arrangement and configuration of recesses in the housing 12 to accommodate the various connectors and wiring connections are described in the parent application hereof and for simplicity are not repeated herein.

In order to provide for more accurate temperature detection, a groove is provided at a lower portion of the device. More specifically, the groove is provided in the outer surface of feed tube shaft 17 under heating coil 23. The compound body 24 may include a separate groove therein to enable placing the sensor within the groove in shaft 17. The groove in shaft 17 accommodates the heat sensor 34 which, at an upper portion thereof, is included within a tube 40, positioned within a groove in the compound body 24, or otherwise meandering therethrough.

In a particular configuration, the sensor tube 40 is mounted at an upper portion of the housing within the compound body 24, upon entering the housing from connector 38, between the tube 42 and sheath 22 as seen in FIG. 1. Thus, sensor 34 is received within the bore of sheath 22 at this portion. In the lower portion of the nozzle, the sensor 34 is seated within coil 23. Preferably, coil 23 has a variable pitch and, as illustrated in FIG. 1, has a small pitch at the lower portion of the nozzle. Thus, there is an improved heat transfer between the heating coil 23 and sensor 34 at the lower portion. As above noted, at this portion the sensor is seated in a groove formed in a lower portion of the outer periphery of feed tube shaft 17. Thus, heat sensor 34 is in contact with the shaft 17 to obtain an accurate measurement of the temperature of the plastic material flowing therethrough at measuring point 41, at the bottom end 49 of the shaft. Perforated tube 42 is structured appropriately to include a vertically extending longitudinal separation, or void, therein in order to accommodate the heat sensor within heating coil 23 as shown in FIG. 1.

In order to stabilize the assembly, a fixing ring 51 is provided within a peripheral groove (not shown) at the bottom end 49 of feed tube shaft 17. Ring 51 prevents vertical movement of heating coil 23 and the compound body 24 along the feed tube, and particularly toward the tip 26. Preferably, fixing ring 51 includes an eye, or other opening, therein.

Figure 2:
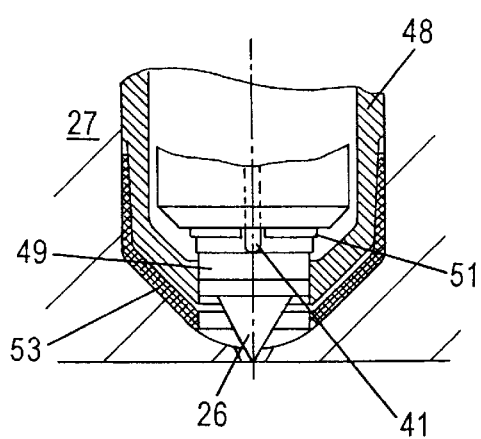
FIG. 2 shows a detail of the structure shown in FIG. 1.

As apparent in FIG. 2, the heat sensor 34 is positioned within the opening in fixing ring 51, thus defining position of the measuring point 41. While the groove in feed tube shaft 17 and the eye in fixing ring 51 may be aligned, it will be appreciated that the groove need not be entirely vertical and may include a meandering portion to accommodate positioning of heat sensor 34 at the eye of ring 51. However, by providing a groove in the outer surface of feed tube shaft 17, the present invention eliminates a requirement which might otherwise arise, such as for boring an additional hole into the shaft. Moreover, in an embodiment wherein heat sensor 34 is included within heating coil 23 and immediately adjacent to (or in contact with) the feed tube shaft 17, rather than being within a groove provided therein, assembly may be simplified still further, particularly in light of establishment of the measuring point 41 by the eye in fixing ring 51.

In order to even out temperature distribution and to minimize temperature dissipation, the embodiment of FIG. 1 includes the following elements.

A shaft foot 48 is provided to prevent heat loss and dissipation from the bottom end 49 of shaft 17 to housing 12. As illustrated in FIG. 1, shaft foot 48 may be threadedly mounted to housing 12. To assure still less heat dissipation, and thus increased accuracy in measurement and control, the inventive structure is further configured to assure that the shaft foot touches tool 27 only at a position far removed from the tip 26 and thus the gate point. It will thus be appreciated that fixing ring 51 prevents movement of the heating coil toward the shaft foot 48. Preferably, shaft foot 48 is made of a material having a heat transfer characteristic less than 15 watts per meter degree Centigrade. It is preferred that a material such as titanium be utilized for the shaft foot.

As still further insulation, there is provided a gap between the shaft foot 48 and sheath 22 and the compound body 24 and heating coil 23 contained therein.

In light of the expense associated with titanium materials, the shaft foot is shown as extending along only a portion of the housing. In the embodiment of FIG. 1, the shaft extends approximately one-half the distance between a shoulder 47 formed in the housing and the tip 26. While the titanium shaft foot may be threadedly mounted on the housing, other modes of attachment may be utilized, such as bonding and the like.

As yet another feature of the invention, an insulating cap 53 is provided in order to lengthen the heat transfer path and reduce further any heat dissipationor heat and transfer to tool 27. The cap 53 is preferably formed of a low heat conductivity material, such as a plastic. The plastic used for the cap 53 is, as may be expected, of a material having a higher melting point than the material to be processed. For example, insulating cap 53 is preferably formed of a temperature-resistant material such as PEEK (polyether etherketone). The insulating cap 53 thus fills the space between the contour of the tool 27 which receives nozzle 10 and the tip 26. This structural feature thus prevents plastic flow from filling this space, where the plastic might deteriorate or spill out and enter the article being made. It should also be recognized that cap 53 also assists in quickly changing plastic masses of different colors.

The insulation thus may surround the entire titanium shaft foot. However, in light of expenses associated with PEEK, the preferred embodiment illustrated in FIG. 1 surrounds the titanium shaft foot for a vertical (longitudinal) distance of approximately the diameter of the housing. As apparent from FIGS. 1 and 2, a gap may be provided between shaft foot 48 and cap 53, thus further to reduce heat dissipation. Cap 53 is placed over the titanium shaft foot as a sleeve which, as above noted, may be retained in place by the tool body.

Thus, with a high heat transfer tip 26, formed of a material such as tungsten carbide (preferably reinforced to withstand abrasion), and low heat transfer shaft foot and insulating cap, it will be appreciated that heat loss to the tool body is minimized and that the accuracy of temperature measurements and control for the injection material and the heating coil are improved significantly by the invention.

Figure 3:
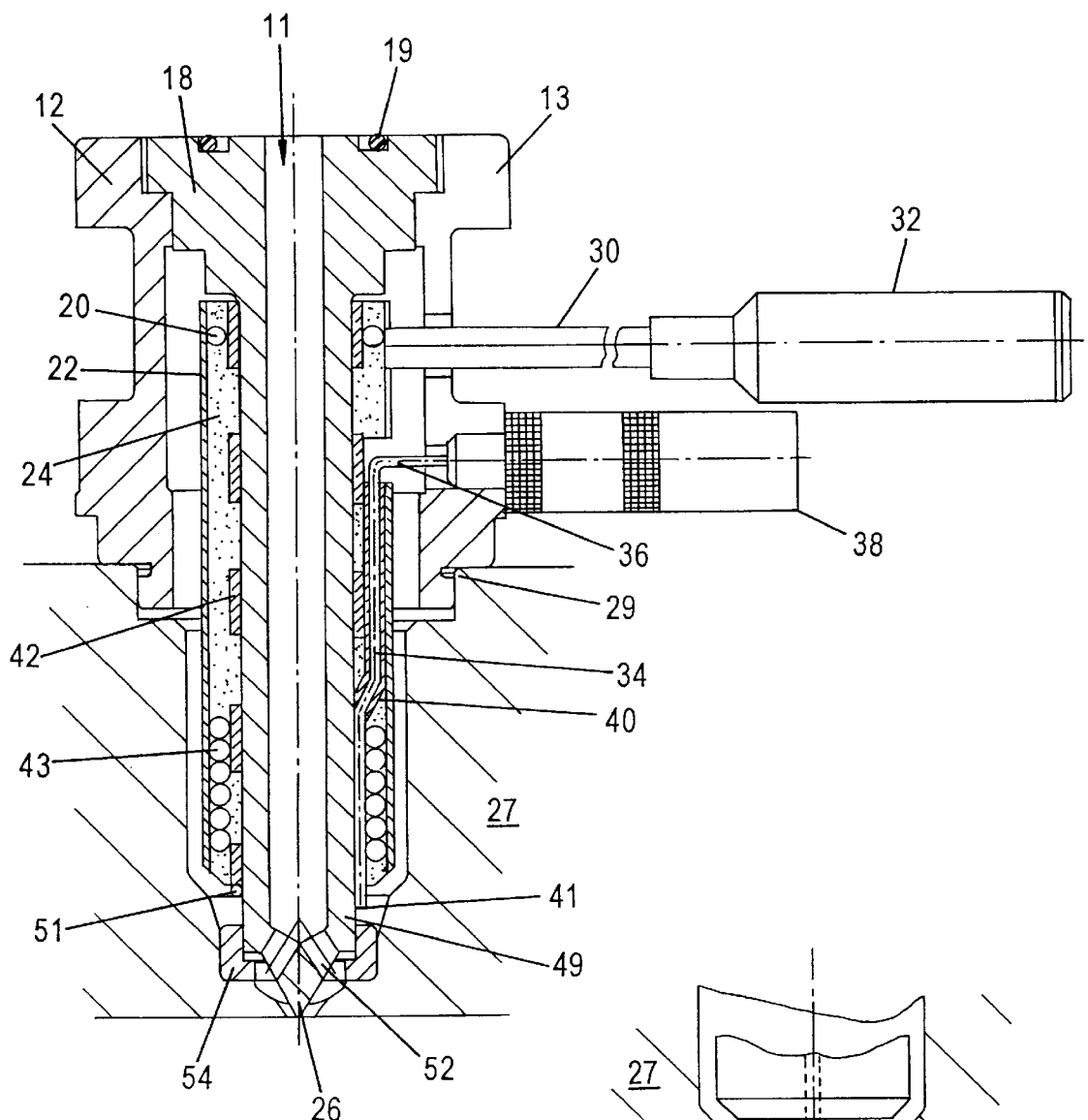
FIG. 3 shows a modification of the embodiment of FIG. 1.

In FIG. 3 there is shown a modification of the inventive structure of FIG. 1. More particularly, in an environment wherein a reduced volume injection nozzle and/or heater is required, and where there may not be sufficient room for the titanium cap forming shaft foot 48 and the insulating cap 53, the nozzle 10 may include a centering sleeve 29. Centering sleeve 29 is preferably clipped on to the housing, rather than being soldered or screwed thereto. Bottom end 49 of the feed tube shaft 17 seals directly in tool 27.

However, in order to obtain various of the advantages arising from the inventive concept, to the extent possible in such a reduced volume configuration, there is provided a receiving ring 54 made of a material having extremely low heat conductivity. The receiving (or insulating) ring 54 is preferably made of titanium, to minimize heat loss in the region of tip 26.

Figure 4:
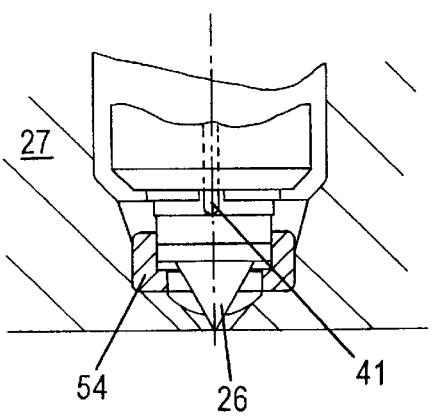
FIG. 4 shows a detailed view of a portion of the embodiment FIG. 3.

As apparent from FIG. 4, the internal horizontal shoulder on ring 54 prevents upward movement thereof in response to material pressure. The ring may have gaps or grooves therein and, while not as efficient as the more complete insulation system of FIGS. 1-2, nonetheless provides a compromise for situations wherein a smaller diameter structure is required. It is also noted that, because there is no contact in the embodiment of FIG. 3 between either the heating element or the feed tube and the tool 27, heat transfer is reduced even without presence of the titanium shaft foot structure.

As an illustration of the savings attained by the inventive concept with respect to heat loss and requirements for additional heating of the plastic injection material, it is estimated that for the embodiment of FIGS. 3–4, nozzle operation would require a temperature which is approximately 20 degrees (C) higher without the use of insulating ring 54. The savings are still greater for the embodiment of FIGS. 1–2.

The foregoing description of the preferred embodiment of the invention has been presented for purposes of illustration and description. It is not intended to be exhaustive or to limit the invention to the precise forms disclosed, since many modifications or variations thereof are possible in light of the above teaching. All such modifications and variations are within the scope of the invention. The embodiments described herein were chosen and described in order best to explain the principles of the invention and its practical application, thereby to enable others skilled in the art to utilize the invention in various embodiments and with various modifications as are suited to the particular use contemplated therefor. It is intended that the scope of the invention be defined by the claims appended hereto, when interpreted in accordance with the full breadth to which they are legally and equitably entitled.

What is claimed is:

1. In a hot runner nozzle assembly (10) including: a housing (12); an externally heatable feed tube (16) in said housing, the feed tube having a shaft (17) within said housing and a tip (26) at a bottom end (49) of said shaft; the improvement comprising:

heating means (20) for said feed tube, said heating means including a heater, said heater including a heater coil (23) surrounding said shaft and extending towards said tip, a heat sensor (34) having an extending portion (41) seated in a positioning groove and extending beyond said heater coil towards said tip, a compound body (24) stabilizing said heating means, said compound body cast around an inner tube (42) surrounding said shaft (17), and a shaft foot (48) of a material having extremely low heat conductivity, said shaft foot surrounding said heating coil with a gap along a lower portion of said shaft for reducing heat dissipation from said tip to said housing.

2. A hot runner nozzle assembly in accordance with claim 1, wherein said heater coil (23) surrounds said shaft, and said heat sensor includes an extending portion which extends along said shaft towards said tip, said heat sensor extending portion being between said shaft and said heater coil.

3. A hot runner nozzle assembly in accordance with claim 1 wherein said shaft includes said positioning groove, said extending portion of said heat sensor positioned in said positioning groove within said heating coil.

4. A hot runner nozzle assembly in accordance with claim 1 wherein said shaft foot is made of titanium.

5. A hot runner nozzle assembly in accordance with claim 1 further comprising an insulating cap surrounding a portion of said shaft foot and isolating the portion of said shaft foot from a tool including the nozzle, thereby lengthening a path for heat transfer from said tip to the tool including the nozzle.

6. A hot runner nozzle assembly in accordance with claim 1 further comprising an insulating cap surrounding a portion of said shaft foot and isolating the portion of said shaft foot from a tool including the nozzle, thereby lengthening a path for heat transfer from said tip to the tool including the nozzle, said insulating cap made of a PEEK material.

7. A hot runner nozzle assembly in accordance with claim 6 wherein said insulating cap surrounds said shaft foot along approximately one-half the length thereof.

8. In a hot runner nozzle assembly (10) including: a housing (12); an externally heatable feed tube (16) in said housing, the feed tube including a shaft (17) within said housing and a tip (26) at a bottom end of said shaft; the improvement comprising:

heating means (20) for said feed tube, said heating means including a heater extending towards said tip and a heat sensor (34) extending beyond said heater towards said tip, said heater including a heater coil (23) surrounding said shaft, and said heat sensor including an extending portion which extends along said shaft towards said tip, said heat sensor extending portion being between said shaft and said heater coil, said heating means further including an outer sheath (22), said heater coil and heat sensor being within said sheath, further comprising a fixing ring (51) around said shaft and supporting said outer sheath and preventing said heating coil and said sheath from moving toward said tip.

9. A hot runner nozzle assembly in accordance with claim 8 wherein said fixing ring comprises an opening, said heat sensor extending portion held in said opening.

10. A hot runner nozzle assembly in accordance with claim 8 further comprising a tube surrounding said shaft and surrounded by said heater coil for stabilizing a position of said heating coil during casting of a brass material within said sheath (22) and thereby preventing said heater coil from contacting said shaft during casting of said brass.

11. A hot runner nozzle assembly in accordance with claim 10 wherein said tube is perforated to cast the brass around said heater coil.

12. A hot runner nozzle assembly in accordance with claim 10 further comprising a shaft foot of a material having extremely low heat conductivity, said shaft foot surrounding said heating coil along the portion of said shaft, thereby reducing heat dissipation from said tip to said housing.

13. A hot runner nozzle assembly in accordance with claim 12 further comprising an insulating cap surrounding a portion of said shaft foot and isolating the portion of said shaft foot from a tool including the nozzle, thereby lengthening a path for heat transfer from said tip to the tool including the nozzle, said insulating cap made of a temperature resistant material.

14. A hot runner nozzle assembly in accordance with claim 13 wherein said heating means comprises an outer sheath (22), said heater coil and said heat sensor being within said sheath, further comprising a fixing ring (51) around said shaft and supporting said outer sheath and preventing said heating coil and said sheath from moving toward said tip.

15. A hot runner nozzle assembly in accordance with claim 14 wherein said shaft includes a positioning groove, said extending portion positioned in said positioning groove within said heating coil.

16. A hot runner nozzle assembly in accordance with claim 15 wherein said shaft foot is made of titanium.

17. In a hot runner nozzle assembly (10) including: a housing (12); an externally heatable feed tube (16) in said housing, the feed tube including a shaft (17) within said housing and a tip (26) at a bottom end of said shaft; the improvement comprising:

heating means (20) for said feed tube, said heating means including a heater extending towards said tip and a heat sensor (34) extending beyond said heater towards said tip;

said heater including a heater coil (23) surrounding said shaft, and said heat sensor including an extending portion which extends along said shaft towards said tip, said heat sensor extending portion being between said shaft and said heater coil;

said heating means further including an outer sheath (22), said heater coil and heat sensor being within said sheath;

a fixing ring (51) positioned around said shaft for supporting said outer sheath and for preventing said heating coil and said sheath from moving toward said tip;

further comprising a shaft foot of a material having extremely low heat conductivity, said shaft foot surrounding said heating coil along the portion of said shaft, thereby reducing heat dissipation from said tip to said housing.

18. A hot runner nozzle assembly in accordance with claim 17 wherein said fixing ring having an opening therein, said heat sensor extending portion held in said opening.

19. A hot runner nozzle assembly in accordance with claim 18 wherein said shaft includes a positioning groove, said extending portion positioned in said positioning groove within said heating coil.

20. A hot runner nozzle assembly in accordance with claim 18 wherein said shaft foot is made of titanium.

21. A hot runner nozzle assembly in accordance with claim 20 further comprising an insulating cap surrounding a portion of said shaft foot and isolating the portion of said shaft foot from a tool including the nozzle, thereby lengthening a path for heat transfer from said tip to the tool including the nozzle, said insulating cap made of a temperature resistant material.

22. A hot runner nozzle assembly in accordance with claim 18 further comprising an insulating cap surrounding a portion of said shaft foot and isolating the portion of said shaft foot from a tool including the nozzle, thereby lengthening a path for heat transfer from said tip to the tool including the nozzle, said insulating cap made of a PEEK material.

23. A hot runner nozzle assembly in accordance with claim 22 wherein said insulating cap surrounds said shaft foot along approximately one-half the length thereof.

24. In a hot runner nozzle assembly (10) including: a housing (12); an externally heatable feed tube (16) in said housing, the feed tube including a shaft (17) within said housing and a tip (26) at a bottom end thereof; the improvement comprising:

heating means (20) for said feed tube, said heating means including a heater extending towards said tip and a heat sensor (34) extending beyond said heater towards said tip;

said heater including a heater coil (23) surrounding said shaft, and said heat sensor including an extending portion which extends along said shaft towards said tip, said heat sensor extending portion being between said shaft and said heater coil; further comprising a shaft foot of a material having extremely low heat conductivity, said shaft foot surrounding said heating coil along the portion of said shaft, thereby reducing heat dissipation from said tip to said housing.

\* \* \* \* \*